United States Patent
Li (10) Patent No.: US 11,368,302 B2
(45) Date of Patent: Jun. 21, 2022

(54) KEY MANAGEMENT DEVICE AND PROCESSOR CHIP HAVING BYPASS CHANNELS

(71) Applicant: Nuvoton Technology Corporation, Hsinchu Science Park (TW)

(72) Inventor: Yu-Shan Li, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 108 days.

(21) Appl. No.: 17/014,767

(22) Filed: Sep. 8, 2020

(65) Prior Publication Data
US 2021/0075609 A1    Mar. 11, 2021

(30) Foreign Application Priority Data
Sep. 9, 2019  (TW) ................................. 108132364

(51) Int. Cl.
*H04L 9/08* (2006.01)
*G11C 17/18* (2006.01)
(Continued)

(52) U.S. Cl.
CPC .......... *H04L 9/0897* (2013.01); *G06F 13/362* (2013.01); *G11C 11/412* (2013.01);
(Continued)

(58) Field of Classification Search
CPC ... H04L 9/0618; H04L 9/0631; H04L 9/0643; H04L 9/0897; H04L 9/302; H04L 9/3066;
(Continued)

(56) References Cited

U.S. PATENT DOCUMENTS 7,318,160 B2 *   1/2008   Hopkins ................. G06F 21/86
                                                713/189
8,213,620 B1   7/2012   Sussland et al.
(Continued)

FOREIGN PATENT DOCUMENTS

TW      200415506 A     8/2004
TW      200834375 A     8/2008
TW      201923595 A     6/2019

OTHER PUBLICATIONS

Bossuet et al, Architectures of flexible symmetric key crypto engines—a survey: From hardware coprocessor to multi-crypto-processor system on chip, ACM, 2013.*
(Continued)

*Primary Examiner* — Minh Dinh
(74) *Attorney, Agent, or Firm* — Muncy, Geissler, Olds & Lowe, P.C.

(57) ABSTRACT

A key management device for data encryption/decryption is provided. The key management device includes a static random access memory (SRAM), a register, an arbitration circuit, and a control circuit. The arbitration circuit is electrically connected to an encryption/decryption device having a plurality of encryption/decryption circuits. There is a bypass channel between each encryption/decryption circuit and the arbitration circuit. The control circuit arranges a key lookup table in the SRAM or the register, and manages a key database including the SRAM and a one-time programmable memory. The key lookup table includes a key number and metadata of each key stored in the key database. In response to the control circuit retrieving a specific key corresponding to a specific key number indicated by a key read command, the control circuit directly transmits the retrieved specific key to the corresponding encryption/decryption circuit through the corresponding bypass channel.

10 Claims, 8 Drawing Sheets

(51) Int. Cl.
*G06F 13/362* (2006.01)
*H04L 9/06* (2006.01)
*G11C 11/412* (2006.01)

(52) U.S. Cl.
CPC ............ *G11C 17/18* (2013.01); *H04L 9/0618* (2013.01); *H04L 2209/12* (2013.01)

(58) Field of Classification Search
CPC ... H04L 9/3242; H04L 2209/12; G06F 21/72; G06F 13/362; G11C 11/412; G11C 17/18
See application file for complete search history.

(56) References Cited

U.S. PATENT DOCUMENTS

| | | | |
|---|---|---|---|
| 11,184,164 B2* | 11/2021 | Rahimi | ................ H04L 9/0861 |
| 2004/0123123 A1* | 6/2004 | Buer | .................... H04L 63/164 |
| | | | 713/176 |
| 2004/0205331 A1* | 10/2004 | Hussain | ................. G06F 21/72 |
| | | | 713/153 |
| 2008/0263269 A1 | 10/2008 | Kadosh | |
| 2013/0275656 A1 | 10/2013 | Talagala | |
| 2015/0043729 A1 | 2/2015 | Gopal et al. | |

OTHER PUBLICATIONS

Office Action dated Jul. 9, 2021 in U.S. Appl. No. 16/731,744, 17 pages.

\* cited by examiner

KEY MANAGEMENT DEVICE AND PROCESSOR CHIP HAVING BYPASS CHANNELS

CROSS REFERENCE TO RELATED APPLICATIONS

This application claims the benefit of Taiwan Patent Application No. 108132364, filed on Sep. 9, 2019, in the Taiwan Intellectual Property Office, the disclosure of which is incorporated herein in its entirety by reference.

BACKGROUND OF THE INVENTION

Field of the Invention

The present invention relates to a technical field of data transmission, and more particularly to a key management device and a processor chip having bypass channels.

Description of the Related Art

In recent years, more computer systems or control systems need to perform encryption/decryption on data. However, the process of decrypting data often requires a key or a private key. When the number of keys or private keys is increased, the management and storage of the keys may cause considerable trouble to the user. In order to add or create a key in a conventional key management device, the user often needs to know and remember the storage location of the key, such as a specific address in a specific memory; furthermore, in order to read a specific key, the user also needs to access the corresponding storage location to read the specific key. Obviously, the conventional key management method is quite inconvenient for the user.

In addition, a conventional key management device and a conventional cryptographic device have to be connected to a bus. If the bus is tapped, the key taken out by the key management device may be obtained by the eavesdropper, so there is a risk of the key being stolen.

Therefore, what is needed is to develop a key management device and a processor chip having bypass channels to solve the aforementioned problems.

BRIEF SUMMARY OF THE INVENTION

An objective of the present invention is to provide a key management device and a processor chip having bypass channels to solve the conventional technical problems.

In order to achieve the objective, a key management device having bypass channels is provided. The key management device includes: a static random-access memory (SRAM); a register; and an arbitration circuit, electrically connected to an encryption/decryption device having a plurality of encryption/decryption circuits, and there is a bypass channel between each encryption/decryption circuit and the arbitration circuit; and a control circuit configured to set a key lookup table in the static random-access memory or the register, and manage a key database. The key database comprises the static random-access memory and a one-time programmable (OTP) memory disposed outside the key management device, and the key database is configured to store at least one key. The key lookup table comprises a key number and metadata of each of the at least one key stored in the key database. In response to the control circuit retrieving a specific key corresponding to a specific key number indicated by a key read command, the control circuit directly transmits the specific key to the corresponding encryption/decryption circuit through the bypass channel.

In some embodiments, the key database comprises a flash memory disposed outside the key management device. In some embodiments, the key management device and the encryption/decryption device are independent hardware circuits, and the key management device and the encryption/decryption device are electrically connected to the bus. The arbitration circuit is configured to select one of a signal from the bus or another signal from one of the encryption/decryption circuits to communicate with the control circuit.

In some embodiments, attributes of the metadata of the key in the key lookup table comprise a key size, an owner, a security level, a privilege level, a readable attribute, a revoke attribute, a booting state, and a storage location.

In some embodiments, the plurality of encryption/decryption circuits comprise an advanced encryption standard (AES) encryption/decryption circuit, a keyed-hash message authentication code (HMAC) encryption/decryption circuit, and an elliptic curve cryptography (ECC) encryption/decryption circuit, and an RSA encryption/decryption circuit, a random number generating circuit, or a combination thereof.

In order to achieve the objective, a processor chip is also provided. The processor chip includes: a processor; a one-time programmable (OTP) memory; a flash memory; an encryption/decryption device, comprising a plurality of encryption/decryption circuits; and a key management device, electrically connected to the processor, the OTP memory, the flash memory, and the encryption/decryption device through a bus. The key management device comprises: a static random-access memory (SRAM); a register; and an arbitration circuit, wherein there is a bypass channel between each encryption/decryption circuit and the arbitration circuit; and a control circuit configured to set a key lookup table in the static random-access memory or the register, and manage a key database. The key database comprises the static random-access memory and a one-time programmable (OTP) memory disposed outside the key management device, and the key database is configured to store at least one key. The key lookup table comprises a key number and metadata of each of the at least one key stored in the key database; wherein in response to the control circuit retrieving a specific key corresponding to a specific key number indicated by a key read command, the control circuit directly transmit the specific key to the corresponding encryption/decryption circuit through the bypass channel.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE INVENTION

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise", "include" and "have", and variations such as "comprises", "comprising", "includes", "including", "has" and "having" will be acknowledged to imply the inclusion of stated elements but not the exclusion of any other elements.

Figure 1:
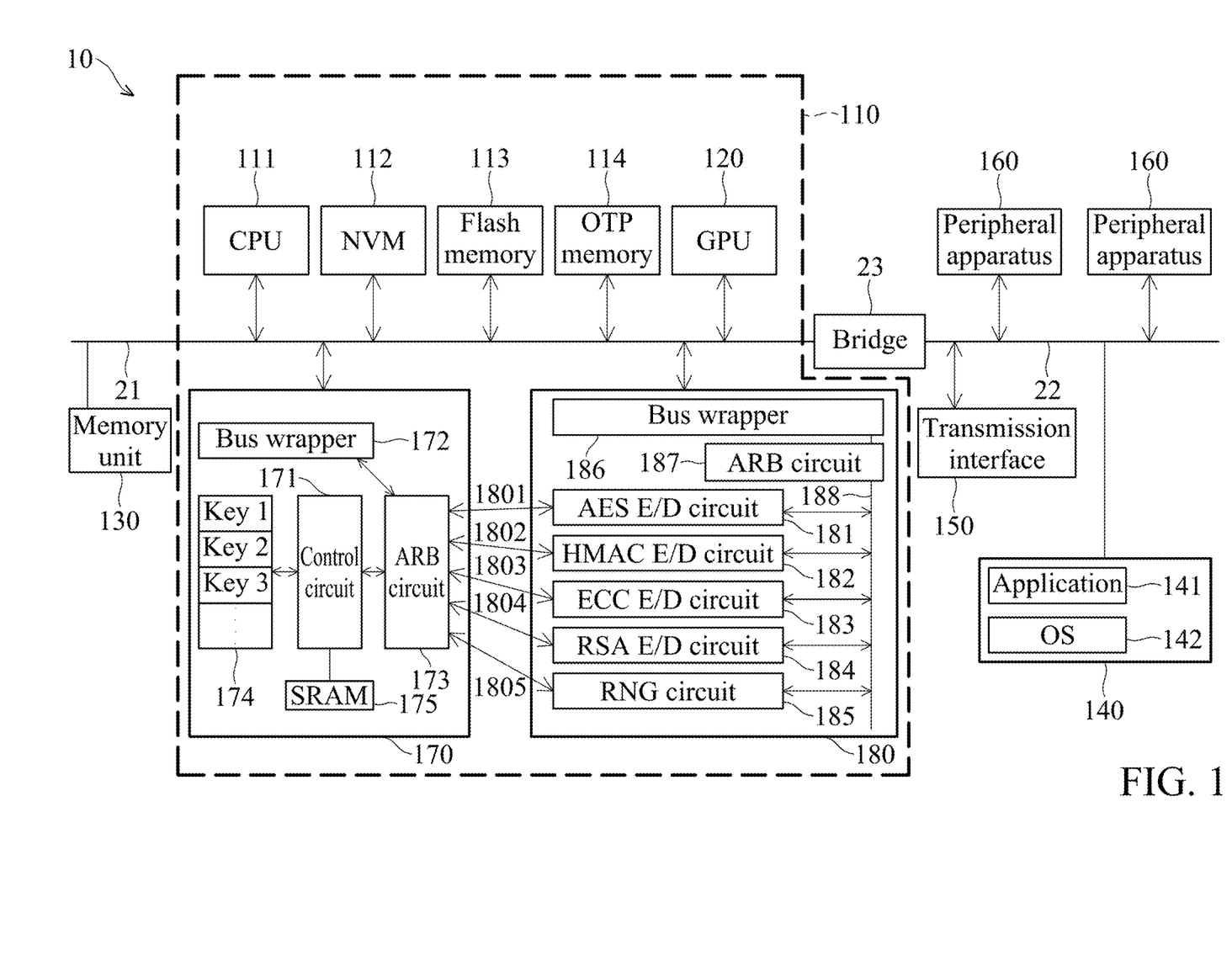
FIG. 1 is a block diagram of a control system of an embodiment of the present invention.

Please refer to FIG. 1, which is a block diagram of a control system of an embodiment of the present invention.

As shown in FIG. 1, a control system 10 comprises a processor chip 110 and a memory unit 130, a storage device 140, a transmission interface 150, and at least one peripheral device 160. The processor chip 110 is electrically connected to the memory unit 130 via the bus 21. In some embodiments, for example, the bus 21 can be an advance high-efficiency bus (AHB). For example, the transmission interface 150 and the peripheral device 160 can be electrically connected to the bus 22, and the buses 21 and 22 can communicate with each other via the bridge 23. In an embodiment, for example, the bus 22 can be an advanced system bus (ASB) or an advance peripheral bus (APB); however, the present invention is not limited to the examples described herein.

The processor chip 110 can comprise a central processing unit (CPU) 111 (or a microprocessor), a volatile memory 112, a flash memory 113, and a one-time programmable (OTP) memory 114, a graphic processing unit (GPU) 120, a key management device 170 and an encryption/decryption device 180. For example, the volatile memory 112 can be a static random access memory (SRAM). For example, the flash memory 113 can be a NAND flash memory. The OTP memory 114, for example, can be referred as a programmable read-only memory (PROM), which can use a non-volatile memory having a lock-bit register, for example, the nonvolatile memory can be implemented by a flash memory, an erasable programmable read-only (EPROM) memory or an electrically erasable programmable read-only (EEPROM) memory.

For example, after the central processing unit 111 programs or writes the data into the OTP memory 114, the central processing unit 111 can modify the lock-bit register of the OTP memory 114, for example, the central processing unit 111 can modify the lock bit from 1, which indicates a non-locked state, to 0, which indicates a locked state, so as to indicate that the data stored in the OTP memory 114 is unable to be modified again, and the lock bit is unable to be modified from 0 to 1.

For example, the graphic processing unit 120 can be an individual graphic processor, or integrated into the central processing unit 111. The memory unit 130 can be a volatile memory, such as dynamic random access memory (DRAM); however, the present invention is not limited to the examples described herein. The storage device 140 can be a nonvolatile memory, such as a hard disk drive, a solid-state drive (SSD), a flash memory, or an ROM memory; however, the present invention is not limited to the examples described herein. In some embodiments, the storage device 140 can be electrically connected to the bus 22.

The storage device 140 can store at least one application 141 and an operating system 142 such as Windows, Linux, MacOS or an embedded OS. The processor chip 110 can read and store the operating system 142 and the application 141 to the memory unit 130 for execution.

The transmission interface 150 comprises at least one data transmission interface, such as a USB interface, a USB Type-C interface, a Thunderbolt interface, a general-purpose input/output (GPIO) interface, a universal asynchronous receiver/transmitter (UART) interface, a serial peripheral interface (SPI) interface, an inter-integrated circuit (I2C) interface, or a combination thereof; however, the present invention is not limited to the examples described herein. In an embodiment, the peripheral device 160 can include an input device, such as a keyboard, a mouse, and a touch pad, and so on; however, the present invention is not limited to the examples described herein.

For example, the key management device 170 can be a hardware circuit of an intelligent key storage device, and this hardware circuit can be implemented by an application-specific integrated circuit (ASIC) or a field programmable gate array (FPGA). For example, the key management device 170 can operate different key according to a control command of the processor chip 110, for example, the key management device 170 can perform operations of adding a key, reading a key, erasing or revoking one of keys, erasing or revoking all keys; however, the present invention is not limited to the examples described herein.

In an embodiment, the key management device 170 comprises a control circuit 171 and a bus wrapper 172, an arbitration (ARB) circuit 173, a register 174 and a static random-access memory (SRAM) 175. The control circuit 171 can control various operations of key, such as the operations of creating key, reading key, deleting single key, and deleting all keys. In an embodiment, the bus wrapper 172 can provide a conversion interface between signals of an internal device of the key management device 170 and signals of the bus 21. The arbitration circuit 173 can be used to select the signal from bus 21 (e.g., a signal or command sent from the CPU 111) or the bypass signal from the encryption/decryption device 180 (e.g., through bypass channels 1801 to 1805). The register 174 can be used to record a key number of each key and fields of metadata corresponding to each key. The key information recorded in the register 174 can be called as a key lookup table. In another embodiment, the control circuit 171 can store the key lookup table in the static random-access memory (SRAM) 175. For example, the static random-access memory (SRAM) 175 can be used as a storage space of a key database, to store at least one key. In some embodiments, the control circuit 171 can back up the key lookup table to the static random-access memory (SRAM) 175 or the flash memory such as the flash memory 113 of the processor chip 110 or the flash memory of the storage device 140. The detailed operation of the key management device 170 will be illustrated in an embodiment in following paragraphs.

For example, the encryption/decryption (cryptographic) device 180 can be a hardware circuit supporting various encryption/decryption algorithms, and the encryption/decryption device 180 includes hardware circuits corresponding to various encryption/decryption algorithms, such as an advanced encryption standard (AES) encryption/decryption circuit 181, a keyed-hash message authentication code (HMAC) encryption/decryption circuit 182, an elliptic curve cryptography (ECC) encryption/decryption circuit 183, an RSA encryption/decryption circuit 184, a random number generating (RNG) circuit 185, or a combination thereof, and these hardware circuits can perform hardware acceleration for corresponding encryption/decryption algorithms. For purposes of illustration, the encryption/decryption circuits 181-184 are abbreviated as E/D circuits 181-184, as shown in FIG. 1. For example, the random number generating circuit 185 can be a pseudorandom number generating circuit or a true random number generating circuit. Each of encryption/decryption circuits 181 to 185 has a respective bypass channel (e.g., bypass channels 1801 to 1805) to directly communicate with the key management device 170 using bypass signals without passing through bus 21.

In addition, the encryption/decryption device 180 further includes an arbitration (ARB) circuit 187 that is configured to determine whether to allow the encryption/decryption circuits 181 to 185 to use the command and data from bus 21 according to a predetermined arbitration mechanism. For example, the command issued from the CPU 111 needs to pass through bus 21 and the arbitration circuit 187 to be transmitted to the encryption/decryption circuits 181 to 185, and the encrypted or decrypted content of the encryption/decryption circuits 181 to 185 still needs to pass through bus 21 and arbitration circuit 187 to be transmitted to the CPU 111.

In the embodiment, the key management device 170 and the encryption/decryption device 180 are independent hardware circuits, for example, can be regarded as independent semiconductor intellectual properties, and the key management device 170 and the encryption/decryption device 180 generally communicate with each other through bus 21. Because the special mechanism of key management requires high security, and the key management device 170 and the encryption/decryption device 180 can communicate through the bypass channels 1801 to 1805. For example, after the key management device 170 has retrieved the key, the retrieved key can be directly transmitted to the corresponding encryption/decryption circuit through the corresponding bypass channel for decryption without passing through bus 21. Accordingly, the security of the control system 10 can be further improved to avoid the risk of the bus 21 being tapped to expose the key.

For example, in an embodiment, when the control system 10 is operating, the different applications 141 can use different encryption/decryption algorithms to encrypt the to-be-encrypted contents (such as user password), respectively; for example, the encryption/decryption circuits 181~185 disposed in the encryption/decryption device 180 are used to perform encryption/decryption operations. Different encryption/decryption algorithms may use different key sizes, such as in a range of 64 bits to 4096 bits. After the encryption/decryption device 180 completely encrypts the to-be-encrypted content, the encryption/decryption device 180 can transmit the key to the key management device 170 for key management.

The key management device 170 can have different operations for key management, such as operation of storing or adding key, reading key, erasing or deleting single key, erasing or deleting all keys. For example, in order to perform the operation of storing key, the key management device 170 can receive a key and metadata corresponding to the key, from the processor chip 110 (or the encryption/decryption device 180). In an embodiment, attribute fields of the metadata can include key size, owner, security level, privilege level, readable attribute, revoke attribute and the booting state, and so on; however, the present invention is not limited to the examples described herein. The content of each field of the metadata will be described in the following paragraphs.

The key size, for example, can be expressed by an amount of bits of a key, such as 80 bits, 128 bits, or 256 bits. According to the different encryption/decryption algorithm, the encryption/decryption device 180 can support a key size in a range of 64 bits to 4096 bits. The owner attribute, for example, can indicate an owner of a key, and the user not owning the key is unable to read the key. A key owner can be set according to different requirements, for example, a key owner can be set as CPU, the processor chip 110, AES, HMAC, ECC and RSA. For example, when a field of a key owner in metadata of a key is set as AES, it indicates that the AES encryption/decryption circuit of the encryption/decryption device 180 can read this key.

The security-level attribute indicates a security level of a key, and, for example, can be classified into a secure level and a non-secure level. The key with the secure level can be used by the owner with the same secure level, and it is not necessary to check the security level of the owner for the key with the non-secure level. It should be noted that the security-level attribute in the metadata of the key must be in cooperation with the processor chip 110 to be effective. For example, the processor chip 110 can be classified into a secure processor or a non-secure processor, and the field setting of the security level of the metadata of the key can be effective when the processor chip 110 is a secure processor. When the processor chip 110 is a non-secure processor, the field setting of the security level of the metadata of the key is not effective.

The privilege-level attribute indicates a level of privilege of the key, and for example, can be classified into a privilege level and a non-privilege level. The key with privilege level can be used by the owner with the same privilege level, and the key with the non-privilege level does not need to check the level of the privilege of the owner. Different user may have different permissions, for example, an administrator or a super user has the highest privilege level, and can access the key set with the privilege level; a general user not with the privilege level is unable to access the key with the privilege level.

The readable attribute indicates whether the key can be read by the processor chip 110. For example, when the owner field of the key is CPU, it indicates that the key can be readable for the processor chip 110. When the owner field of the key is other encryption/decryption circuit, the key management device 170 can determine, according to the readable attribute of the key, whether the processor chip 110 can read the key.

The revoke attribute is recorded in an internal register of the key management device 170, and unable to be set when the key is created. For example, in a general use condition, the key management device 170 can set the revoke attribute of the key as 0, and it indicates that this key can be used normally. When the user executes a key delete operation, the key management device 170 possibly deletes the key stored in the flash memory or the OTP memory; however, the key stored in the flash memory or the OTP memory may be unable to be actually deleted because of the setting of the lock bit. Therefore, when the key management device 170 performs the key delete operation, the key management device 170 sets the revoke attribute corresponding to the to-be-deleted key in the internal register, and after the revoke attribute corresponding to the to-be-deleted key in the key management device 170 is set, it is unable to modify the revoke attribute, and the key corresponding to the revoke attribute cannot be recovered to the usable state. At this time, no matter whether the condition of any other attribute is met, the key management device 170 is unable to read or use the key, of which the revoke attribute is set already, and it indicates that the revoke attribute of the key takes precedence over other attributes.

The booting state attribute indicates the booting state in which the key can be used, and for example, the booting states can be classified into a first booting state BL1 and a second booting state BL2. For example, when the booting state of the control system 10 is in the first booting state BL1, the key management device 170 can use the key with the attributes of the first booting state BL1 and the second booting state BL2. When the booting state of the control system 10 is in the second booting state BL2, the key management device 170 can use the key with the attribute of the booting state BL2.

Figure 2A:
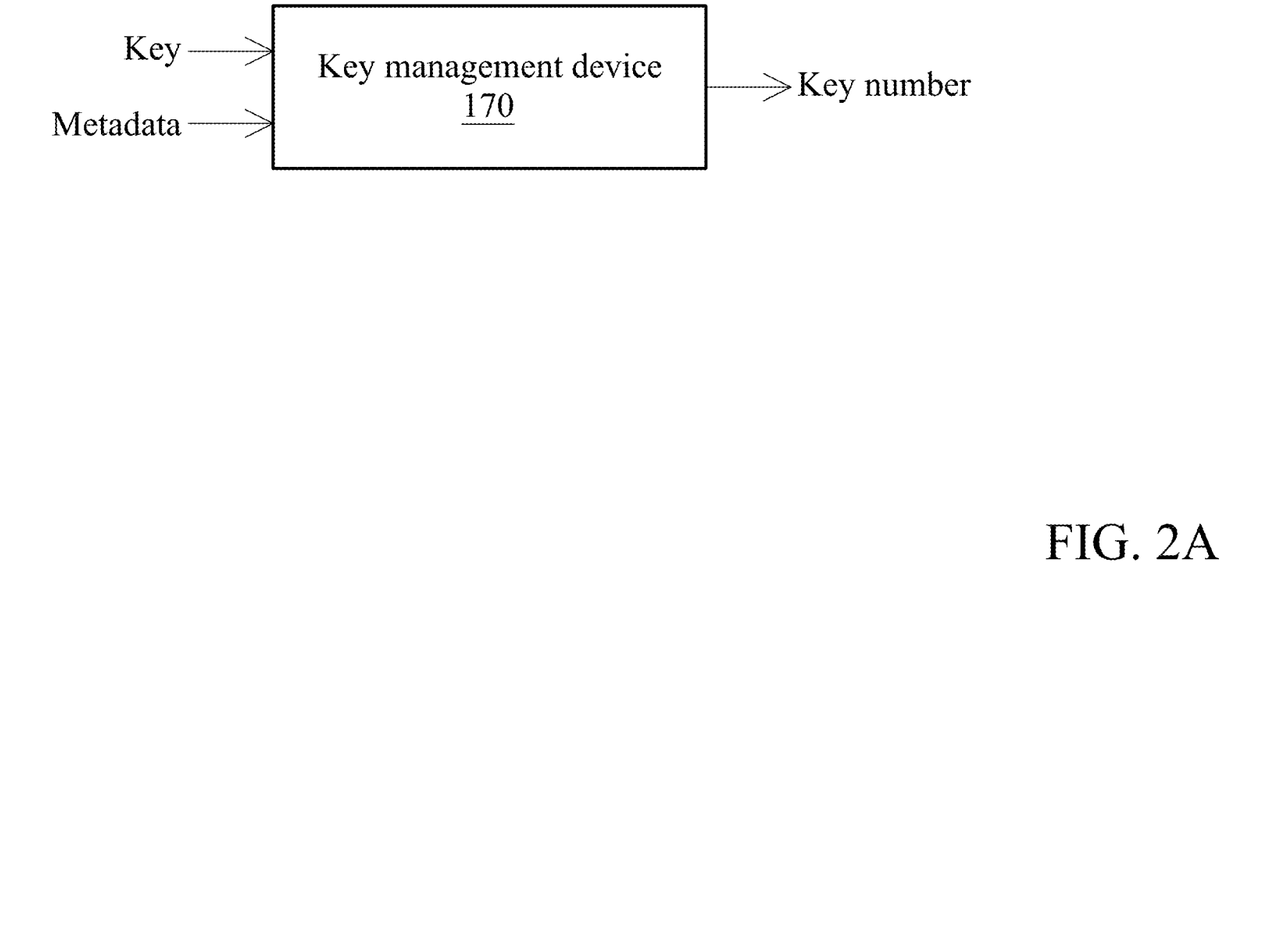
FIGS. 2A and 2B are schematic views of operations of creating a key, according to one embodiment of the present invention.
Figure 2B:
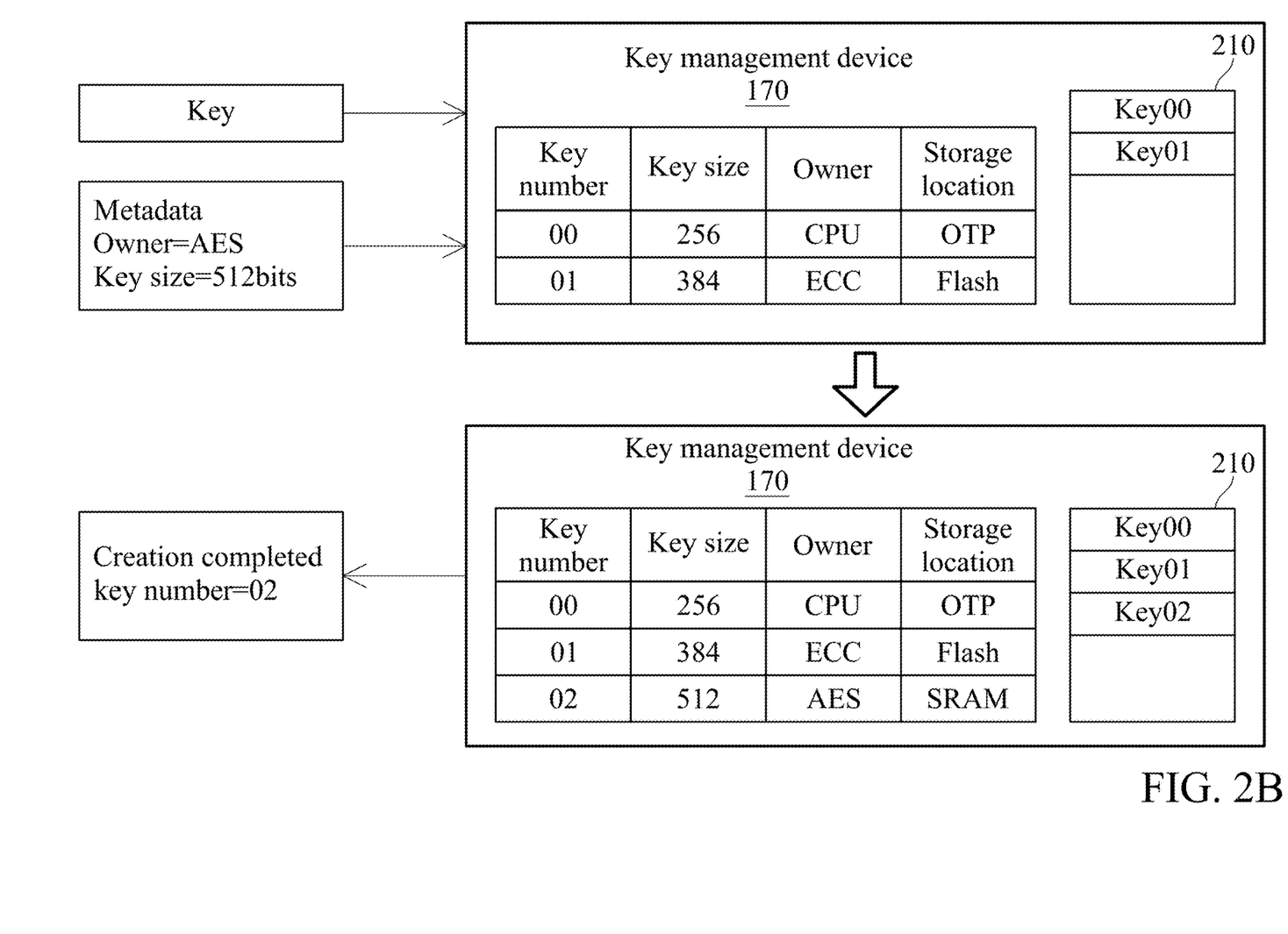

FIGS. 2A and 2B are schematic views of an operation of creating a key, according to one embodiment of the present invention.

In an embodiment, when a user wants to create a new key in the key management device 170, the user can input content in each field of metadata of to-be-created key, such as the key size, owner, security level, privilege level, readable attribute, revoke attribute, and booting state attribute, and so on in advance. The user then inputs the content of the to-be-created key. After the contents required for the to-be-created key are input, the user can start the key storing process, for example, the user can click a software button. Next, according to the key size and the remaining space of the internal storage space, the key management device 170 can determine whether to store this input key. When the internal storage space in the key management device 170 is smaller than the key size, the key management device 170 reports a read failure message to the central processing unit 111, to notify the user. When the internal storage space in the key management device 170 is larger than or equal to the key size, the key management device 170 starts to create the key, and the key management device 170 then reports a complete state after the key is created completely, so as to notify a user of a key number of the created key, as shown in FIG. 2A.

In an embodiment, the key database of the key management device 170 can be separated into several storage spaces, such as the flash memory, the OTP memory and the SRAM 175. The flash memory can be the flash memory 113 of the processor chip 110 or the flash memory of the storage device 140, the OTP memory can be the OTP memory 114 of the processor chip 110, or the OTP memory electrically connected to the buses 21 or 22. One of ordinary skill in the art can understand that the flash memory, the OTP memory and the SRAM 175 with appropriate addresses can be used to form the key database upon actual requirement, and the present invention is not limited thereto. In some embodiments, the key length (size) of different keys may be different, the control circuit 171 can use the space of the maximum supported key size, such as 4096 bits, to store different lengths of key, so that the key lengths, not including metadata, of all keys can be aligned to 4096 bits. In some other embodiments, the control circuit 171 can determine, according to the bit width of the SRAM 175, an amount of the entries to be stored in the SRAM 175.

As the embodiment mentioned above, in a condition that the key management device 170 starts a continuous key-creation mode, after the key management device 170 creates the key completely, the key management device 170 can report the complete state and the corresponding key number to notify user, and also can remind the user to continue to input other key. The key management device 170 can record which key number is used already, and every time the key management device 170 creates new key, the key management device 170 can find, in ascending order of the key number, a next key number not used yet. When the user continues to create multiple keys and the amount of the created keys reaches an upper limit of the key storage amount of the key management device 170, the key management device 170 reports a key creation (storage) failure message to notify the user, and does not perform this key creation operation.

The control circuit 171 of the key management device 170 can allocate, according to a predetermined arbitration mechanism, the keys with different attributes to different storage spaces of the key database. When the specific key comprises the secure level or the privilege level, the control circuit 171 stores the specific key in the OTP memory, and sets the lock bit of the OTP memory after the specific key is written into the OTP memory, so that the content of the specific key is unable to be modified, thereby improving security. When the remaining storage space of the OTP memory is insufficient to store the new key, the key management device 170 can store the new key in the flash memory or the SRAM 175. Furthermore, the register 174 of the key management device 170 can record the storage locations, such as the flash memory, the OTP memory or the SRAM 175, of the different keys in the key database.

As shown in FIG. 2B, which exemplarily shows that two keys, such as a key 00 and a key 01, are created in the key management device 170 already and the keys 00 and 01 are stored in the key database 210 of the key management device 170, such as being stored in the OTP memory and flash memory, respectively. The register 174 of the key management device 170 can record the key numbers of the keys 00 and 01 and the corresponding metadata. For the sake of convenience, the key size and the owner attribute are taken as examples of the metadata for illustration. It should be noted that the key database 210 is a collective name, and the key database 210 can comprise a plurality of storage spaces to store keys, for example, the key database 210 can include an OTP memory, a flash memory and a SRAM 175. The flash memory can be a flash memory 113 of the processor chip 110 or a flash memory of the storage device 140, and the OTP memory can be the OTP memory 114 of the processor chip 110, or the OTP memory electrically connected to the buses 21 or 22.

After receiving a key creation command, a key and corresponding metadata including, such as owner attribute being AES and the key size being 512 bits, from the processor chip 110, the key management device 170 can set the key as a key 02, and store the key 02 in the SRAM 175 in the key database. Next, the key management device 170 updates the attribute fields and the storage location related to the key 02 in the key lookup table of the register 174. After the update operation is completed, the key management device 170 reports a key creation complete message and the key number of the key 02 to the processor chip 110. The user can know the key number of the stored key, but not know the storage location of the key. In order to read the key, the user just needs to transmit the key number of the to-be-read key to the key management device 170 via the processor chip 110 or the encryption/decryption circuits 181~185. After the information of the to-be-read key passes the authentication of key management device 170, the key management device 170 reports the key to the processor chip 110 or the encryption/decryption circuits 181~185.

Figure 2C:
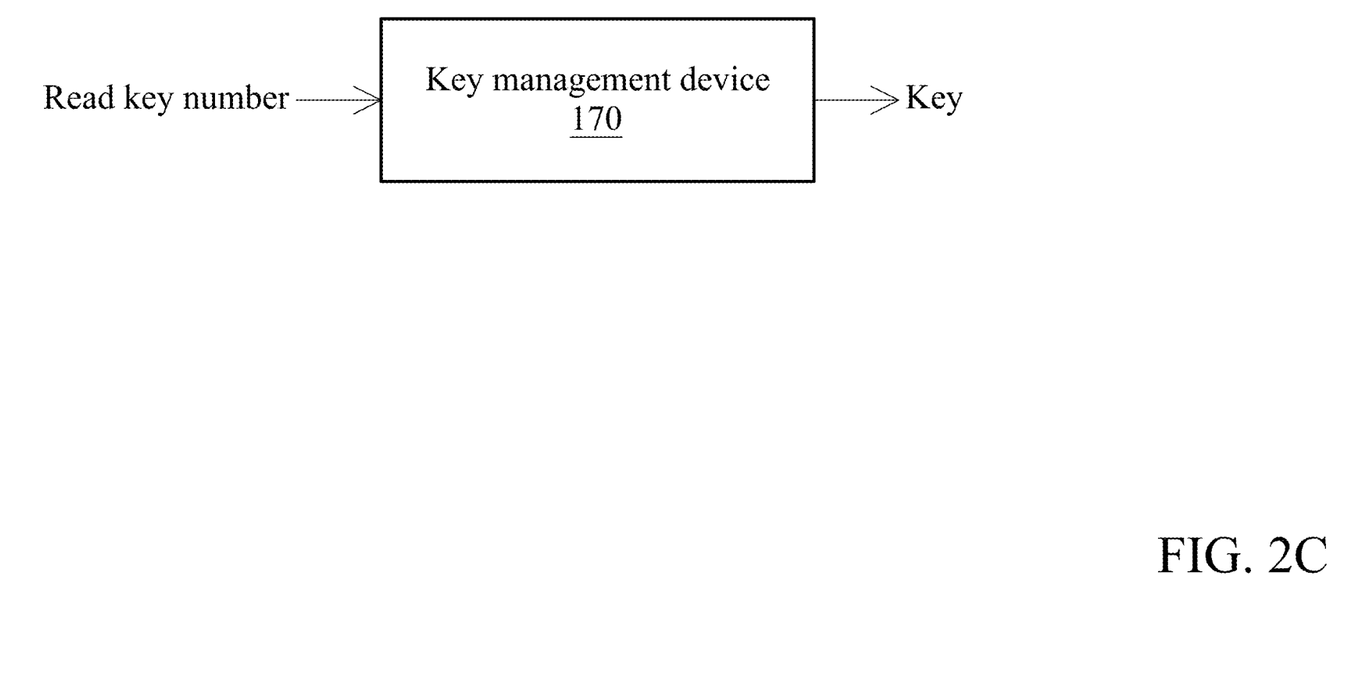
FIGS. 2C and 2D are schematic views of operations of reading a key, according to one embodiment of the present invention.
Figure 2D:
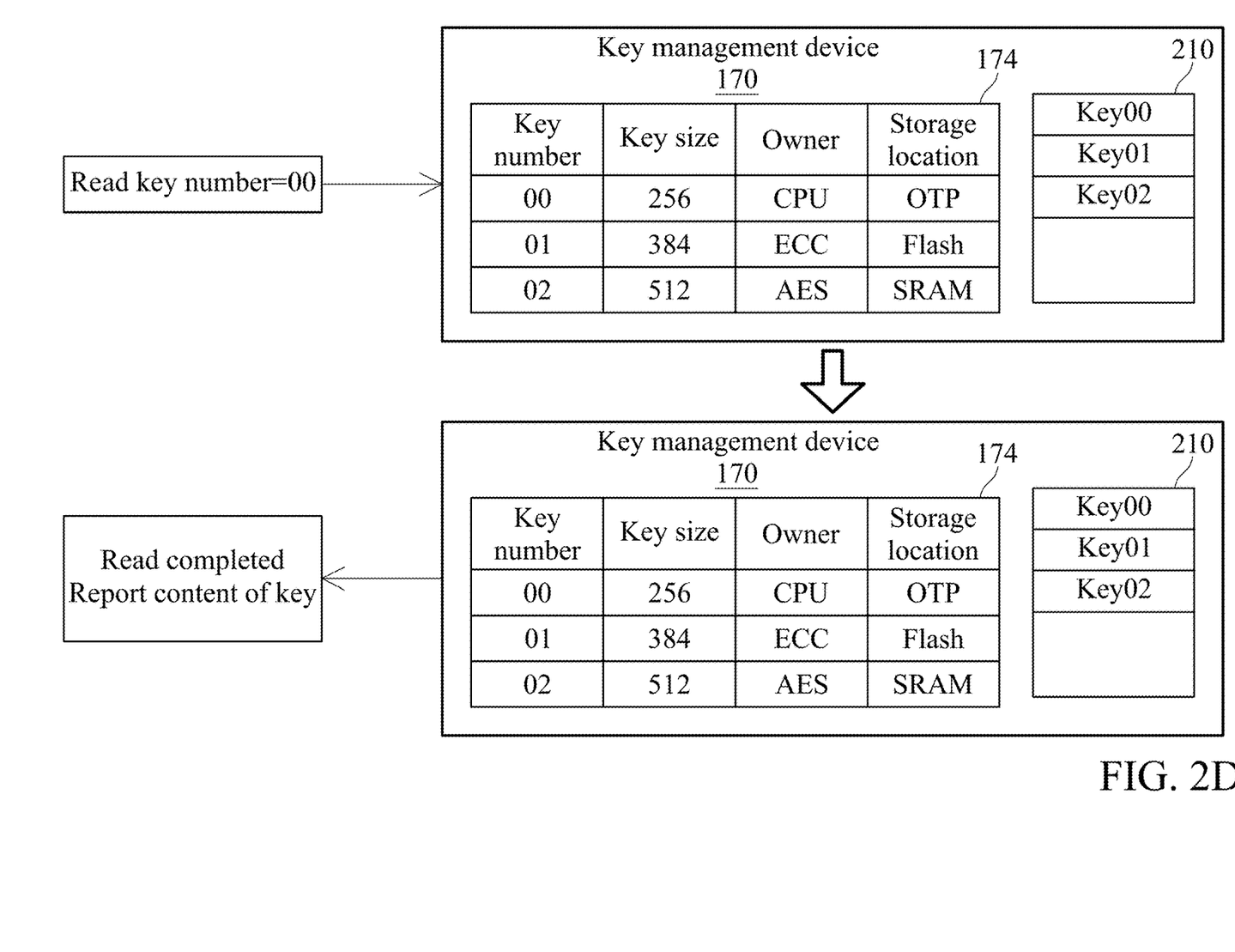

FIGS. 2C and 2D are schematic views of an operation of reading a key, according to one embodiment of the present invention.

In an embodiment, when one of the processor chip 110 or the encryption/decryption circuits 181~185 of the encryption/decryption device 180 wants to read a key stored in the key management device 170, the key management device 170 receives a key number of the to-be-read key from the encryption/decryption device 180 or the processor chip 110. After the key management device 170 receives the key number from the encryption/decryption device 180 or the processor chip 110, the key management device 170 can search the key corresponding to the key number from the key database, and also can determine, according to the metadata of the to-be-read key, whether the device or the user wanting to read the key meets the permission or privilege level recorded by the metadata of the to-be-read key, and further check whether the revoke attribute of the to-be-read key is set or asserted, and further check whether the current booting state of the control system 10 matches the booting state attribute of the metadata of the key attribute. For example, when the revoke attribute of the to-be-read key is set or asserted, the key management device 170 determines that the key is unable to read, and reports a read failure message to the device which wants to read the key. When the revoke attribute of the to-be-read key is not set yet, and conditions of the security level, privilege level, readable attribute, booting state of the to-be-read key are also met, the key management device 170 can report the key and a read complete message, to the device which wants to read the key, and the operation of reading the key is completed. When any of these conditions is not met, the key management device 170 reports the key read failure message to the device which wants to read the key.

Please refer to FIG. 2D. When the processor chip 110 wants to read the key corresponding to the key number 00, the processor chip 110 can transmit the key number, which is the key number 00, of the to-be-read key, to the key management device 170. The key management device 170 searches the metadata related to the key number 00, in the key lookup table of the register 174, and checks whether the processor chip 110 is the owner of the key number 00. When the key management device 170 confirms that the processor chip 110 is actually the owner of the key number 00, the key management device 170 reports a read complete message and the content of the key corresponding to the key number 00, to the processor chip 110.

In another embodiment, if the AES encryption/decryption circuit 181 transmits a key read command (e.g., reading key 02) to the key management device 170 through the bypass channel 1801, the key management device 170 first searches for the associated metadata of key 02 from the key lookup table in the register 174, and confirms whether the AES encryption/decryption circuit 181 is the owner of key 02. In addition, when one of the encryption/decryption circuits 181 to 185 transmits the key read command to the key management device 170 through the corresponding bypass channel, it has also transmits the status of the encryption/decryption circuit itself (e.g., security level, privilege level, etc.) to the key management device 170 through the corresponding bypass channel. When the key management device 170 determines that the AES encryption/decryption circuits 181 is indeed the owner of the key 02 and the metadata matches, the key management device 170 can directly transmit the key content corresponding to key 02 to the AES encryption/decryption circuit 181 through the bypass channel 1801. Then, the AES encryption/decryption circuit 181 can perform decryption of the obtained key. In the embodiment, the flow for reading the key needs not to pass through the bus 21, thereby improving the security of the system while keeping the key.

Figure 2E:
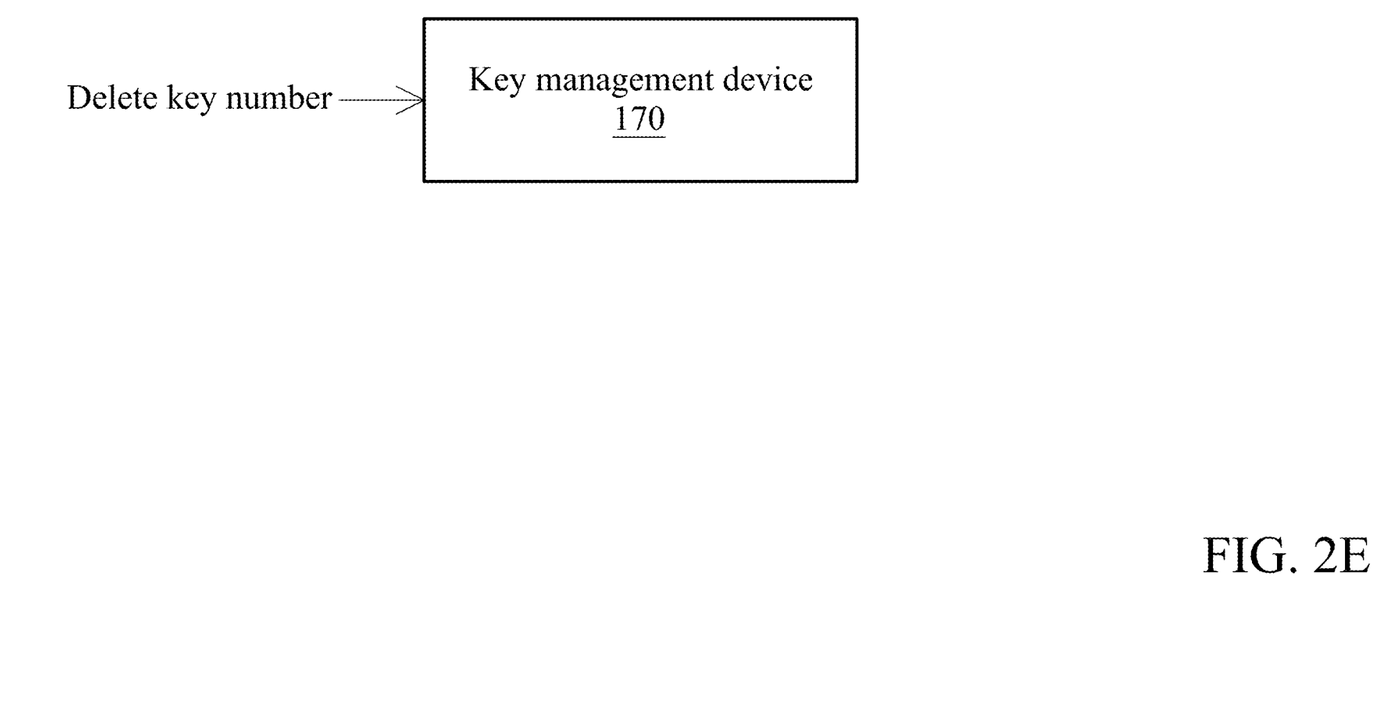
FIGS. 2E and 2F are schematic views of operations of deleting a key, according to one embodiment of the present invention.
Figure 2F:
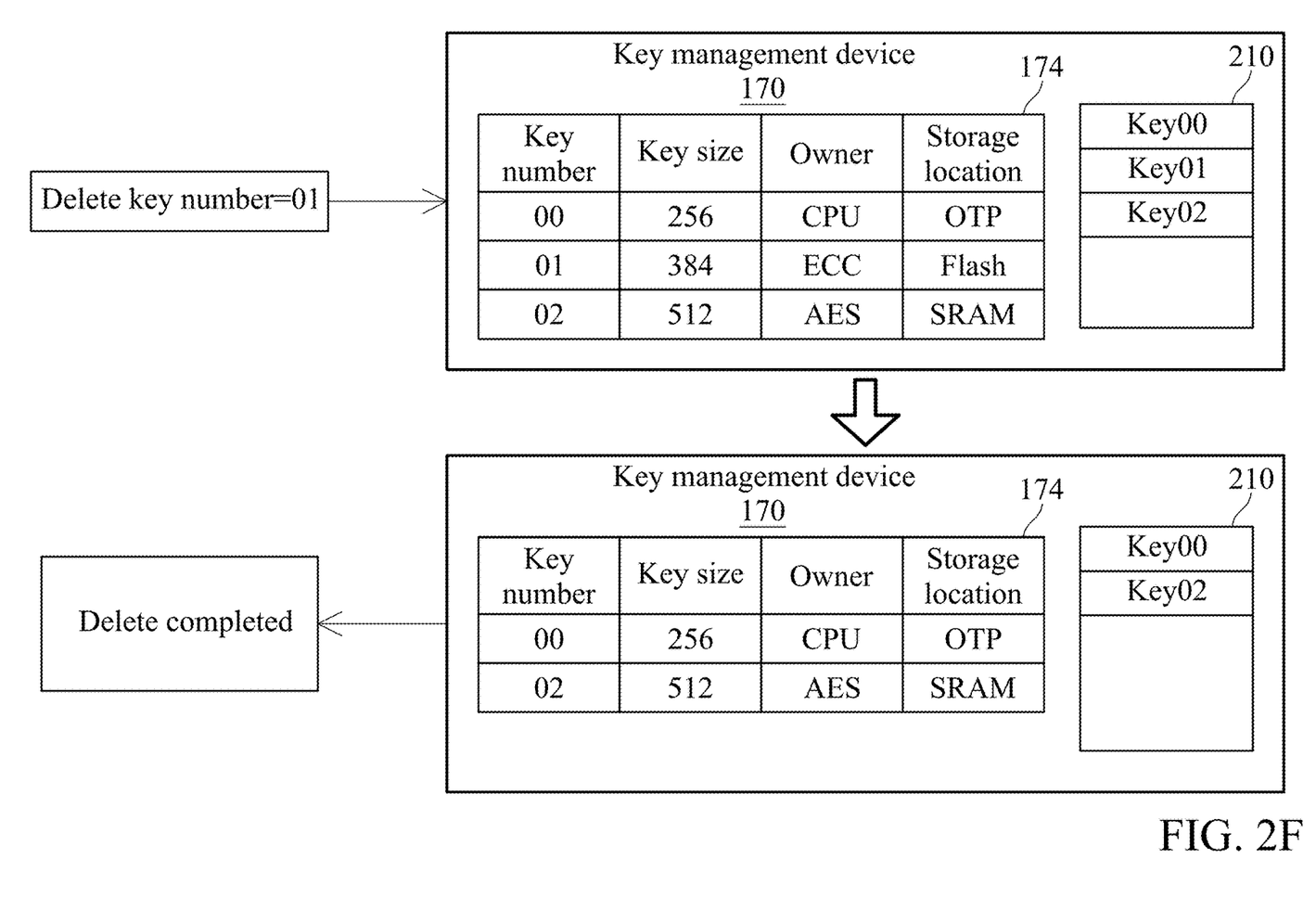

FIGS. 2E and 2F are schematic views of an operation of deleting a key, according to one embodiment of the present invention.

In an embodiment, when the user determines that a specific key stored in the key management device 170 is already no longer used for the user, the user can send a single-key erase or delete command and the be-to-erased key number, to the key management device 170 via the processor chip 110. After the key management device 170 determines that the key erase command is a valid command sent by the processor chip 110, the key management device 170 deletes the to-be-erased key from the corresponding storage space of the key database, and reports successful delete message to the processor chip 110, as shown in FIG. 2E.

In detail, in a condition that key 00, key 01 and key 02 are already stored in the key management device 170, after the key management device 170 receives the single-key erase or delete command and the be-to-erased key number from the processor chip 110, the key management device 170 can obtain the key number, the key size and the storage location of the to-be-erased key from the key lookup table of the register 174, and then calculate the storage space and range occupied by the to-be-erased key. The control circuit 171 of the key management device 170 can delete all data stored in the storage space corresponding to the to-be-erased key, and update the key lookup table in the register 174 and calculate the remaining space of each storage space of the key database again, as shown in FIG. 2F.

It should be noted that, when the key management device 170 determines that the to-be-erased key contained in the erase command is stored in the OTP memory, the key management device 170 is unable to modify or delete the data stored in the OTP memory. At this time, the key management device 170 can set the revoke attribute field of the metadata related to the key number 01 in the key lookup table of the register 174, to indicate that the key corresponding to the key number 01 is already revoked persistently and unable to be read or used. In this embodiment, besides the single-key erase or delete command, the user can send an all-key erase command to the key management device 170 upon requirement, via the processor chip 110, to control the key management device 170 to delete all keys, and all storage spaces other than the OTP memory are released to the initial states. In a condition of using the all-key erase command, the processor chip 110 does not need to send the key number to be erased In an embodiment, the key management device 170 can have an independent reset signal, and each time after the key management device 170 is reset, the key management device 170 should be initialized. For example, each time after the key management device 170 is reset, the content of the register 174 is also cleared, so the control circuit 171 must rebuild the key lookup table originally stored in the register 174 according to the data stored in different nonvolatile memory. For example, the control circuit 171 can read the key lookup table backed up in the OTP memory and the flash memory, and/or read the metadata, which corresponds to the stored keys, from the OTP memory and the flash memory. However, the metadata, corresponding to the keys, of the backup key lookup table may not be the latest metadata, so the control circuit 171 can read, from the OTP memory and the flash memory, the metadata corresponding to the stored keys, so as to update the key lookup table. After the control circuit 171 rebuilds the key lookup table, it indicates that the key management device 170 is initialized completely, so the user can start to use the key management device 170. Furthermore, when the key management device 170 is not completely initialized, any operation related to key are regarded as an invalid operation by the key management device 170.

In some embodiments, the control system 10 comprises a tamper detection circuit configured to detect whether the control system 10 is attacked or the data is tampered. When the tamper detection circuit detects that the control system 10 is attacked or the data is tampered, the tamper detection circuit transmits a detection signal to the key management device 170, and the key management device 170 then starts to remove all keys and related data, which includes backup data related to the keys, stored in the key management device 170 according to the detection signal. As a result, besides the OTP memory, the key management device 170 is recovered to the initial state.

Figure 3:
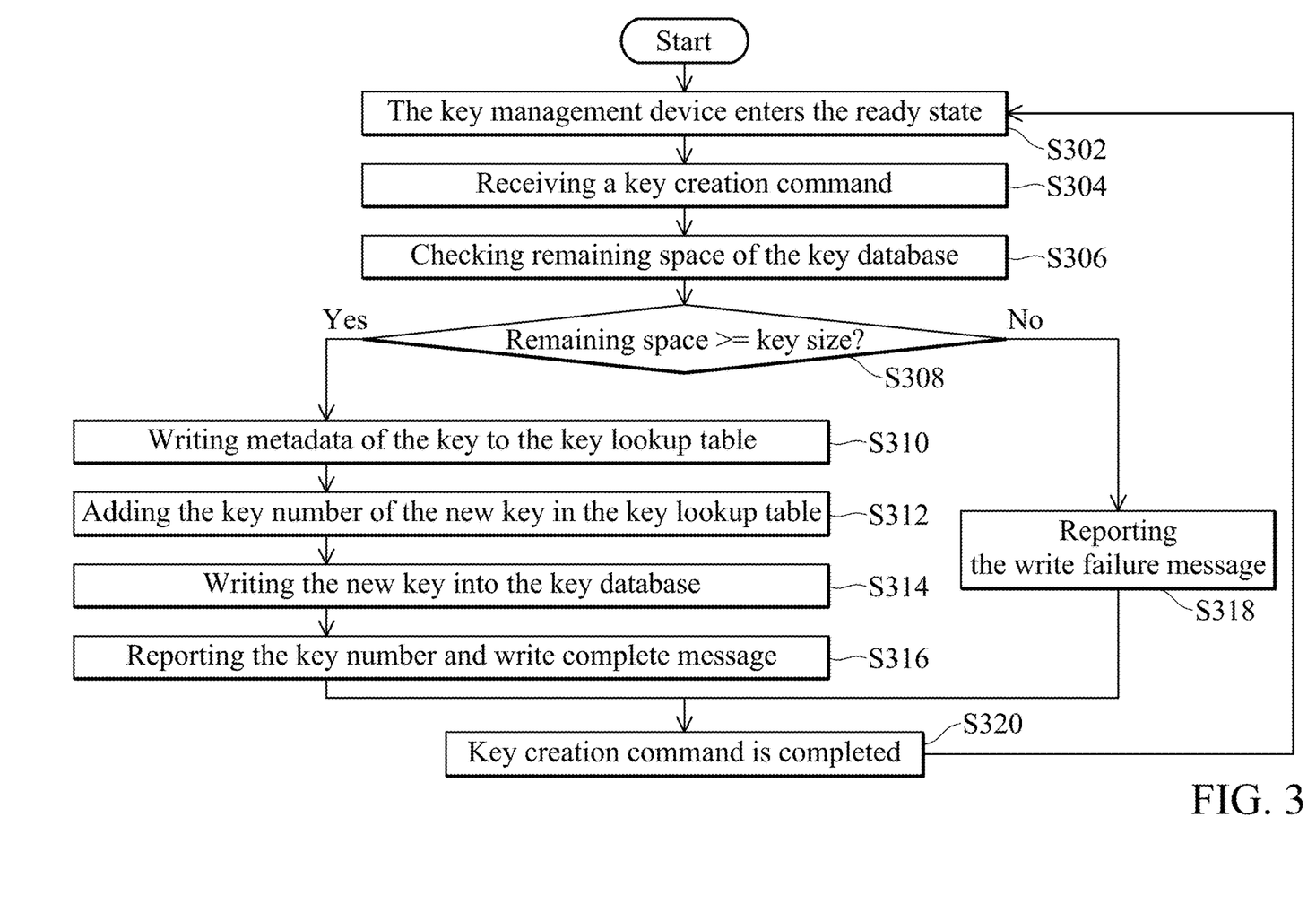
FIG. 3 is a flowchart of an operation of creating a new key by a key management device, according to one embodiment of the present invention.

FIG. 3 is a schematic view of a flowchart of creating a new key by a key management device, according to one embodiment of the present invention.

In step S302, the key management device 170 enters the ready state. For example, after being powered on and reset, the key management device 170 is initialized first, and then enters the ready state after the initialization is completed, so as to receive different key operation commands.

In step S304, the key management device 170 receives a key creation command. In an embodiment, the key creation command can be from the central processing unit 111.

In step S306, the key management device 170 checks the remaining space of the key database. For example, the key management device 170 can check the remaining spaces of different storage spaces of the key database, such as the remaining spaces of the SRAM 175, the flash memory 113 and the OTP memory 114.

In step S308, the key management device 170 determines whether the remaining space is larger than or equal to the key size of the key to be created. When the remaining space is larger than or equal to the key size of the key to be created, step S310 is executed; otherwise, step S318 is executed. In another embodiment, in step S308, the key management device 170 can determine whether the remaining space is larger than or equal to the key size of the key to be created and also determine whether the key database reaches the upper limit of the key storage amount already. When the remaining space is larger than or equal to the key size to be created and the key database does not reach the upper limit of the key storage amount, step S310 is executed. When the remaining space is smaller than the key size or the key database already reaches the upper limit of the key storage amount, step S318 is executed.

In step S310, the key management device 170 writes the metadata of the key into the key lookup table. The attributes of the metadata of the new key written into the key lookup table can include key size, owner, security level, privilege level, readable attribute, booting state and storage location of the to-be-created key.

In step S312, the key management device 170 adds the key number of the new key in the key lookup table. For example, the control circuit 171 of the key management device 170 can search for the key number that has not been used yet from number 0 in ascending order, and then use the minimum key number that has not been used yet, as the key number of the new key.

In step S314, the key management device 170 writes the new key into the key database. For example, the key management device 170 can store the new key in the OTP memory of the key database according to the security level or privilege level set in the metadata of the new key. When the security level or privilege level of the metadata of the new key is not set yet, the key management device 170 can store the new key in the SRAM 175 or the flash memory 113 of the key database.

In step S316, the key management device 170 reports the key number and the write complete message to the central processing unit 111.

In step S318, the key management device 170 reports the write failure message to the central processing unit 111.

In step S320, the key creation command is completed, and the flow returns to the step S302.

According to above-mentioned contents, the present invention provides a key management device for data encryption/decryption and a processor chip, and the key management device can determine the storage location of each key in the key database according to the key size and the current state (such as security state or remaining space) and automatically determine whether the remaining space of the storage location is enough to store the key with the set size. After the key is stored successfully, the key management device transmits the key number to the user, so that the user can read or delete the key according to the key number, without additionally recording the storage location of the key or other information related to the key. Furthermore, the key management device of the present invention must be initialized after every reset operation, so as to prevent the key data from being tampered possibly; furthermore, the key management device of the present invention can remove all stored keys according to the tamper detection signal, so as to ensure the security of key management.

In addition, the key management device and the encryption/decryption device in the present invention are independent hardware circuits, and there are multiple bypass channels between these two devices for direct communication. For example, the key management device can directly transmit the key to the corresponding encryption/decryption circuit through the bypass channel without passing through the bus, which can further improve the security of the control system to avoid the risk of the bus being eavesdropped and exposing the key.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A key management device having bypass channels, comprising:
   a static random-access memory (SRAM);
   a register; and
   an arbitration circuit, electrically connected to an encryption/decryption device having a plurality of encryption/decryption circuits, and there is a bypass channel between each encryption/decryption circuit and the arbitration circuit; and
   a control circuit configured to set a key lookup table in the static random-access memory or the register, and manage a key database, wherein the key database comprises the static random-access memory and an one-time programmable (OTP) memory disposed outside the key management device, and the key database is configured to store at least one key;
   wherein the key lookup table comprises a key number and metadata of each of the at least one key stored in the key database;
   wherein in response to the control circuit retrieving a specific key corresponding to a specific key number indicated by a key read command, the control circuit directly transmits the specific key to the corresponding encryption/decryption circuit through the bypass channel.

2. The key management device as claimed in claim 1, wherein the key database comprises a flash memory disposed outside the key management device.

3. The key management device as claimed in claim 1, wherein the key management device and the encryption/decryption device are independent hardware circuits, and the key management device and the encryption/decryption device are electrically connected to the bus.

4. The key management device as claimed in claim 3, wherein the arbitration circuit is configured to select one of a signal from the bus or another signal from one of the encryption/decryption circuits to communicate with the control circuit.

5. The key management device as claimed in claim 1, wherein attributes of the metadata of the key in the key lookup table comprise a key size, an owner, a security level, a privilege level, a readable attribute, a revoke attribute, a booting state, and a storage location.

6. The key management device as claimed in claim 1, wherein the plurality of encryption/decryption circuits comprise an advanced encryption standard (AES) encryption/decryption circuit, a keyed-hash message authentication code (HMAC) encryption/decryption circuit, and an elliptic curve cryptography (ECC) encryption/decryption circuit, and an RSA encryption/decryption circuit, a random number generating circuit, or a combination thereof.

7. A processor chip, comprising:
   a processor;
   an one-time programmable (OTP) memory;
   a flash memory;
   an encryption/decryption device, comprising a plurality of encryption/decryption circuits; and
   a key management device, electrically connected to the processor, the OTP memory, the flash memory, and the encryption/decryption device through a bus, wherein the key management device comprises:
   a static random-access memory (SRAM);
   a register; and
   an arbitration circuit, wherein there is a bypass channel between each encryption/decryption circuit and the arbitration circuit; and
   a control circuit configured to set a key lookup table in the static random-access memory or the register, and manage a key database, wherein the key database comprises the static random-access memory and a one-time programmable (OTP) memory disposed outside the key management device, and the key database is configured to store at least one key;
   wherein the key lookup table comprises a key number and metadata of each of the at least one key stored in the key database;
   wherein in response to the control circuit retrieving a specific key corresponding to a specific key number indicated by a key read command, the control circuit directly transmit the specific key to the corresponding encryption/decryption circuit through the bypass channel.

8. The processor chip as claimed in claim 7, wherein the key database comprises a flash memory disposed outside the key management device.

9. The processor chip as claimed in claim 7, wherein the key management device and the encryption/decryption device are independent hardware circuits, and the key management device and the encryption/decryption device are electrically connected to the bus.

10. The processor chip as claimed in claim 7, wherein the arbitration circuit is configured to select one of a signal from the bus or another signal from one of the encryption/decryption circuits to communicate with the control circuit.

* * * * *